US006444306B1

(12) United States Patent
Murayama et al.

(10) Patent No.: US 6,444,306 B1
(45) Date of Patent: Sep. 3, 2002

(54) MAGNETIC RECORDING MEDIUM

(75) Inventors: Yuichiro Murayama; Katsuhiko Meguro; Hiroshi Hashimoto, all of Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 131 days.

(21) Appl. No.: 09/705,742

(22) Filed: Nov. 6, 2000

(30) Foreign Application Priority Data

Nov. 5, 1999 (JP) .......................................... 11-315602

(51) Int. Cl.$^7$ ................................................. B32B 5/16
(52) U.S. Cl. ............. 428/323; 428/425.9; 428/694 BU; 428/694 BL
(58) Field of Search ............................. 428/323, 425.9, 428/694 BU, 694 BLL, 900

(56) References Cited

U.S. PATENT DOCUMENTS 6,114,057 A * 9/2000 Kato ....................... 428/694 B
6,224,967 B1 * 5/2001 Murayama et al. ......... 428/216

* cited by examiner

Primary Examiner—Stevan A. Resan
(74) Attorney, Agent, or Firm—Sughrue Mion, PLLC

(57) ABSTRACT

A magnetic recording medium, comprising at least one magnetic layer, said magnetic layer containing ferromagnetic powder and a binder and placed on a nonmagnetic support member, whereby said binder contains a polyurethane resin, using a diol compound having a cyclic structure and a long-chain alkyl chain, and a polyol with weight average molecular weight (Mw) of 400–5000 and having at least one type of polar group selected from the following groups:

—$SO_3M$, —$SO_4M$, —$PO_3M_2$, —$PO_4M_2$, —$NHSO_3M$, >$NSO_3M$, and —$COOM$ where M represents hydrogen, at least one type of alkali metal of potassium, sodium and lithium, and an organic amine containing at least one type of alkylamine and alkanol.

4 Claims, No Drawings

MAGNETIC RECORDING MEDIUM

BACKGROUND OF THE INVENTION

The present invention relates to a magnetic recording medium, which comprises at least one magnetic layer containing a ferromagnetic particles and a binder dispersed in it, and said magnetic layer is formed on a lower layer comprising nonmagnetic powder and a binder on a nonmagnetic support member, whereby the magnetic recording medium has good electromagnetic transfer characteristics and high, durability.

Magnetic recording medium is now widely used in applications such as tape for sound recording, tape for video recording, or floppy disk. In a magnetic recording medium, a magnetic layer comprising ferromagnetic powder dispersed in a binder is formed on a nonmagnetic support member.

The magnetic recording medium must be at high level in electromagnetic transfer characteristics, running durability and running performance characteristics. That is, in an audio tape used for recording and reproducing music, higher reproduction ability to reproduce original sound is required. In a tape for video recording, high electromagnetic transfer characteristics are required such as high ability to reproduce original image.

In addition to high electromagnetic transfer characteristics as described above, the magnetic recording medium must have high running durability. In order to maintain high running durability, abrasive material and lubricant are generally added in the magnetic layer.

In a device or an equipment where the magnetic recording medium is used, the magnetic recording medium slides on and comes into contact with a magnetic head. As a result, lower molecular components in the binder of the magnetic recording medium are floated up near the surface of the magnetic layer and are attached to the magnetic head, i.e. staining occurs on the magnetic head.

The staining on the magnetic head causes deterioration of the electromagnetic transfer characteristics. In particular, in case of a device for high density recording, number of revolutions of the magnetic head is increased. In a digital video tape recorder, the number of revolutions of the magnetic head is usually 9600 rpm, and this is much higher compared with 1800 rpm in an analog video tape recorder for home use and 5000 rpm in a tape recorder for business use. The rate or the speed of sliding of the magnetic recording medium on the magnetic head is increased. Small size magnetic head is now used such as thin film head, and there are now strong demands on the improvement or the elimination of staining on the magnetic head caused by the components of the magnetic recording medium.

As one of the methods to solve the above problems, JP-05070545(A) describes a magnetic recording medium, in which polyurethane polyol with chains extended via urethane bonds is used, and polyurethane with polyurethane polyol resin with weight average molecular weight of 20,000–200,000 and with polyether of $SO_3M$ group is used as a binder.

Also, JP-08165372(A) describes a binder for magnetic recording medium, which comprises resin such as polyurethane resin containing sulfamic acid (salt) group.

Further, JP-09265623(A) describes the use of a magnetic recording medium, which comprises a vinyl chloride type polymer, a polyurethane resin containing sulfamic acid metal salt, and a hardening agent.

In these patent publications, polyester polyol or polyether polyol generally known is used, but there are problems in that dispersion property is not sufficiently high because ester bond or ether bond exerts action and decreases solubility in solvent. On the other hand, polyester is disadvantageous in that it is susceptible to hydrolysis and this decreases the strength of the coating film.

JP-09069222(A) describes a magnetic recording medium, which uses a binder comprising a short-chain diol with cyclic structure, a long-chain polyether polyol and a polyol containing polar group.

However, this uses polyether type substances as the long-chain polyol, and higher durability is required to maintain the strength of the coating film. The ether bond has a problem in heat-resistance at high temperature.

Further, JP-04324110(A) proposes a binder for magnetic recording medium comprising polyurethane resin using polyester polyol, which contains hydrogenated dimer acid as essential component. However, because polyester polyol is used, ester bonds are hydrolyzed during long-term storage, and the strength of the coating film is decreased.

A magnetic recording medium, which comprises polyurethane resin containing dimer diol as diol component, is proposed in JP-11096539(A). Ethylene oxide addition product of sulfoisophthalic acid is used to introduce polar group into polyurethane. Because this has hydrophilic property and has low solubility in organic solvent such as toluene, cyclohexanone, etc., reaction rate with other diisocyanate is decreased. As a result, polar group components are not evenly distributed to the binder, and improvement should be made to increase adsorption to the magnetic material and to increase the dispersion property.

It is an object of the present invention to provide a magnetic recording medium, which has high dispersion property, high smoothness in the coating film and good electromagnetic transfer characteristics. It is another object of the invention to provide a magnetic recording medium having high running durability.

SUMMARY OF THE INVENTION

To attain the above objects, the present invention provides a magnetic recording medium, which comprises at least one magnetic layer, said magnetic layer containing ferromagnetic powder and a binder and placed on a nonmagnetic support member, whereby said binder contains a polyurethane resin, using a diol compound having a cyclic structure and a long-chain alkyl chain, and a polyol with weight average molecular weight (Mw) of 400–5000 and having at least one type of polar group selected from the following groups:

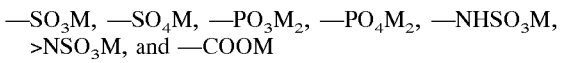

where M represents hydrogen, at least one type of alkali metal of potassium, sodium or lithium, and an organic amine containing at least one type of alkylamine or alkanol.

Further, the present invention provides a magnetic recording medium as described above, wherein said diol compound is at least one type selected from Formula 1 or Formula 2:

Formula 1

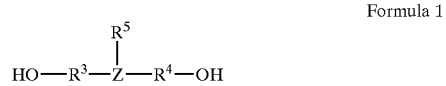

-continued

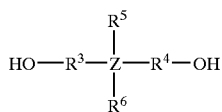

Formula 2 where Z is selected from benzene ring, naphthalene ring and cyclohexane ring;

$R^3$ and $R^4$ each represents an alkylene group containing 1–18 carbon atoms; and $R^5$ and $R^6$ each represents an alkyl group containing 2–18 carbon atoms.

Also, the present invention provides a magnetic recording medium as described above, wherein said diol compound is at least one type selected from Formula 3–Formula 6:

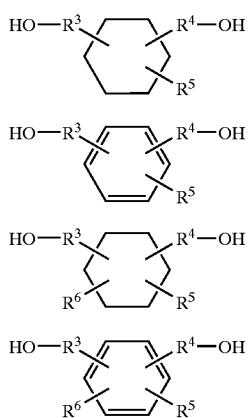

where Z is selected from benzene ring, naphthalene ring and cyclohexane ring;

$R^3$ and $R^4$ each represents an alkylene group containing 1–18 carbon atoms; and $R^5$ and $R^6$ each represents an alkyl group containing 2–18 carbon atoms.

Further, the present invention provides a magnetic recording medium as described above, wherein said diol compound is a dimer diol expressed by Formula 7:

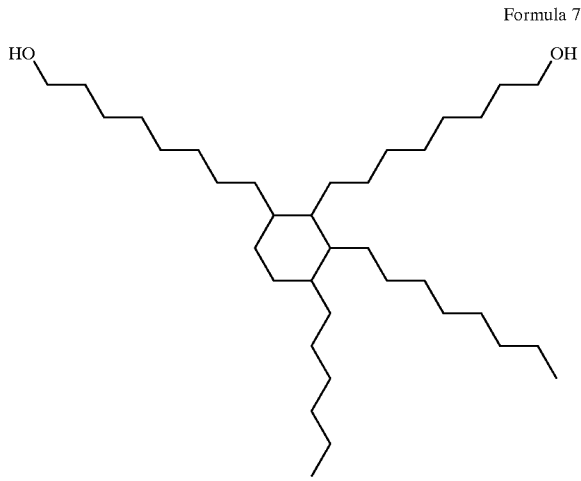

Formula 7

The present invention further provides a magnetic recording medium as described above, wherein a layer containing magnetic powder or inorganic powder and a binder is provided between said nonmagnetic support member and said magnetic layer, and the binder in at least one of said magnetic layer or the lower layer contains said polyurethane resin.

DESCRIPTION OF THE PREFERRED EMBODIMENT

In the magnetic recording medium of the present invention, a diol component is used as polyurethane to constitute a binder, and the diol component comprises at least one type of cyclic structure selected from benzene ring, naphthalene ring, and cyclohexane ring, at least two alkylene groups containing 1–18 carbon atoms, and an alkyl group containing 2–18 carbon atoms. Because of its bending structure, it has superb solubility in solvent. This makes it possible to increase the spreading of urethane molecular chain adsorbed on the surface of magnetic material in a coating solution, and this contributes to the improvement of dispersion stability and provides good electromagnetic transfer characteristics.

Polyester polyol and polyether polyol used in the polyurethane for the binder in a conventional type magnetic recording medium has weight average molecular weight (Mw) of about 2000, while the diol used in the polyurethane of the present invention has Mw of about 1000 at the highest. This contributes to the substantial increase of weight ratio of diisocyanate. As a result, urethane bonds are increased and this induces stronger interaction between molecules. Because a coating film with high glass transition temperature and high dynamic strength can be obtained, high durability can be attained. In particular, it is possible to obtain a magnetic recording medium, which is less susceptible to deterioration or decomposition under high temperature conditions and has high durability.

It has been found that, when a long-chain polyol containing polar group is used in this diol, high electromagnetic transfer characteristics can be obtained.

For the purpose of providing a polar group such as sulfonic acid or its metal salt to polyurethane resin using dimer diol as diol component, low molecular diol having polar group has been used. Such type of diol containing polar group has high hydrophilic property and has lower solubility in polymerization solvent of general-purpose polyurethane such as methyl ethyl ketone, toluene, cyclohexanone, etc. compared with other types of diol. Reaction rate with diisocyanate is slowed down, and polar groups are very likely to be localized in polyurethane molecules. In the polyurethane of the present invention, the use of polyol with Mw of 400–5000 containing polar groups makes it possible to improve the solubility in the solvent in polyurethane polymerization, and the polar groups can be provided evenly to the polyurethane. This contributes to the increase of adsorption amount of the magnetic material and to the improvement of dispersion property.

On the other hand, as an unexpected effect, troubles of adhesion in the cutting process can be decreased. This may be attributable to the fact that urethane molecules not containing polar groups can be decreased and the deposition of non-adsorbed urethane molecules on the surface of coating film in drying or calender process can be prevented.

In the present invention, it is preferable to use dimer diol as a diol having cyclic structure and long-chain alkyl chain. Dimer diol can be obtained by hydrogenation and reduction of dimer acid. Typically, a compound with a structure expressed by the formula 7 is used. The compound commercially marketed by Toa Synthetic Chemical Industry Co., Ltd., Henkel Co., Ltd. may be used.

It is preferable that polyurethane contains a diol having cyclic structure and long-chain alkyl chain in an amount of 10 weight % or more, or more preferably 15–40 weight %.

Also, weight molecular weight (Mw) of the diol having cyclic structure and long-chain alkyl chain is preferably 500–1000. If Mw is lower than 500, the content of diisocyanate substantially increases, and urethane bonds increase. As a result, solubility in solvent is decreased. If Mw is 1000 or more, the strength of the coating film is decreased.

A long-chain polyol containing polar groups to be used to introduce polar groups into polyurethane has preferably weight average molecular weight (Mw) of 400–5000, or more preferably 500–3000, or most preferably 800–2000. If Mw is 400 or less, solubility in solvent is decreased. If Mw exceeds 5000, urethane bonds are substantially decreased, and this may lead to the decrease of the strength of the coating film.

As the polar group, at least one type selected from $-SO_3M$, $-SO_4M$, $-PO_3M_2$, $-PO_4M_2$, $-NHSO_3M$, $>NSO_3M$, or $-COOM$ may be used.

Here, the symbol M represents hydrogen, or at least one type of alkali metal selected from potassium, sodium, or lithium, or at least one type of organic amine including alkylamine or alkanol.

Among these; it is preferable to use $-SO_3M$, $-SO_4M$, and $-PO_3M_2$.

The content of the polar group is preferably $1 \times 10^{-5}$ to $2 \times 10^{-4}$ eq/g. If it is less than $1 \times 10^{-5}$ eq/g, adsorption to the magnetic material is insufficient, and dispersion property is decreased. If it is $2 \times 10^{-4}$ eq/g or more, solubility in solvent is decreased, and this results in lower dispersion property.

As the long-chain polyol containing polar group, the polyether polyol, polyester polyol, etc. as given below may be used.

Polyether polyol can be obtained by adding about 4 to 30 mols of alkylene oxide such as ethylene oxide, propylene oxide, tetrahydrofurane etc. to a low molecular diol containing polar group.

As the low molecular diol containing polar group, the following compounds may be used: 2-sulfosodium-1,4-butanediol, 1-sulfosodium-butanediol, 2-sulfopotassium-1,4-butanediol, 1-sulfopotassium-butanediol, 3-sulfosodium-2,5-dimethylhexene-2,5-diol, 3-sulfopotassium-2,5-dimethylhexene-2,5-diol, 3-sulfosodium-1,5-pentanediol, 3-sulfopotassium-1,5-pentanediol, N,N-bis(2-hydroxyethyl)taurine, 2-amino-1,3-propanediol, 2-amino-2-methyl-1,3-propanediol, ethylene oxide addition product of sulfoisophthalic acid, propylene oxide addition product of sulfoisophthalic acid, etc.

Polyester polyol can be obtained by ester exchange reaction of dibasic acid containing polar group with low molecular diol. When necessary, dibasic acid component already known, which has no polar group, may be simultaneously used.

As the dibasic acid containing polar group, the following compounds may be used:

5-sodium sulfoisophthalic acid (dimethyl), 5-potassium-sulfo-isophthalic acid (dimethyl), 5-potassiumsulfoisophthalic acid (dimethyl), 5-potassiumsulfoisophthalic acid (dimethyl), dicarboxyphenyl phosphoric acid, etc. In the above, (dimethyl) contains at least one of the compounds substituted with acid or methyl group.

As the low molecular diol component of polyester polyol, the following compounds may be used:

Neopentyl glycol, 1,4-butanediol, 1,5-pentanediol, 1,6-hexanediol, 1,8-octanediol, 1,9-nonanediol, 2,2-dimethyl-1,3-propanediol, 2-ethyl-2-butyl-1,3-propanediol, 2,2-diethyl-1,3-propanediol, 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentadiol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, 5-butyl-1,9-nonanediol, polyethylene glycol, polypropylene glycol, polytetramethylene glycol, and aliphatic diol such as ester glycol obtained through reaction of neopentyl glycol with hydroxy pivalic acid, etc. Also, cycloaliphatic diol such as cyclohexanedimethanol, cyclohexanediol, hydrogenated bisphenol A (H-BPA), etc., and ethylene oxide addition product, or propylene oxide addition product of these compounds may be used.

Further, aromatic glycol such as bisphenol A (BPA), bisphenol S, bisphenol P, bisphenol F, etc. or ethylene oxide addition product, or propylene oxide addition product of these compounds may be used.

Among these, it is preferable to use the compound obtained by adding ethylene oxide or propylene oxide to the ethylene oxide addition product of sulfoisophthalic acid, or sulfamic acid-containing polyol using alkylene oxide addition product of 2-amino-1,3-propanediol.

As the diol to be used with these compounds, low molecular diol with molecular weight of 500 or less may be used. More preferably, the compound with molecular weight of 300 or less is used.

More concretely, it is selected from the following compounds:

Aliphatic glycol such as ethyleneglycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimethyl-1,3-propanediol, 2-ethyl-2-butyl-1,3-propanediol, 2,2-diethyl-1,3-propanediol, etc.

Cycloaliphatic glycol such as cyclohexanedimethanol (CHDM), cyclohexanediol (CHD), hydrogenated bisphenol A (H-BPA), or ethylene oxide addition product or propylene oxide addition product of these compounds.

Aromatic glycol such as bisphenol A (BPA), bisphenol S, bisphenol P, bisphenol F, etc., and ethylene oxide addition product or propylene oxide addition product of these compounds.

Among these, it is preferable to use hydrogenated bisphenol A. It is not desirable to use a long-chain diol having molecular weight of more than 500 because concentration of urethane bonds is decreased, and this leads to lower dynamic strength. It is preferable to use these diols in an amount of 50 weight % or less in the polyurethane.

As diisocyanate to be used in the manufacturing process of the polyurethane of the present invention, it is preferable to use: TDI (tolylene diisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate, isophorone diisocyanate, etc.

Weight average molecular weight of polyurethane is preferably 30,000–70,000, or more preferably 40,000–60,000. If it is less than 30,000, the strength of the coating film is decreased and this results in lower durability. If it is 70,000 or more, solubility in solvent is decreased, and this leads to lower dispersion property.

Glass transition temperature (Tg) of the polyurethane is preferably within the range of 40° C. 200° C., or more preferably 70° C. 180° C., or most preferably 80° C. 170° C.

If it is lower than 40° C., the strength of the coating film at high temperature is decreased, and this impairs durability and storage property. If it is more than 200° C., calender moldability is decreased, and this leads to lower electromagnetic transfer characteristics.

The content of OH groups in the polyurethane is preferably in the range of 2–20 groups/molecule, or more preferably 3–15 groups/molecule.

If it is lower than 3 groups/molecule, the reactivity with isocyanate hardening agent decreases, and this results in lower strength of the coating film and poor durability. If it is 15 groups/molecule or more, the solubility in solvent decreases, and this leads to lower dispersion property.

As a compound to be used for providing OH groups, the following compounds having 3-functional or more OH groups may be used:

Trimethylolethane, trimethylolpropane, trimellitic acid anhydride, glycerin, pentaerythritol, hexanetriol, branched polyester or polyether ester having 3 functional or more OH groups.

Among these, it is preferable to use the compound with 3-functional groups. If it has 4 functional groups or more, reaction with the hardening agent may be too quick, and pot life may be shortened.

Vinyl chloride type synthetic resin may be simultaneously used with the polyurethane resin of the present invention. The degree of polymerization of vinyl chloride resin suitable for simultaneous use is preferably between 200 and 600, or more preferably between 250 and 450. The vinyl chloride resin may be obtained by copolymerization of vinyl type monomer, e.g. vinyl acetate, vinyl alcohol, vinylidene chloride, acrylonitrile, etc.

In addition to the polyurethane resin of the present invention, various types of synthetic resin may be used. For instance, vinyl chloride type resin, ethylene—vinyl acetate copolymer, cellulose derivatives such as nitrocellulose resin, or acrylic resin, polyvinyl acetal resin, polyvinyl butyral resin, epoxy resin, or phenoxy resin may be used. These may be used alone or in combination.

In case other types of synthetic resin are simultaneously used, it is preferable that the polyurethane in the magnetic layer is contained in an amount of 10–90 weight % in the binder, or more preferably 20–80 weight %, or most preferably 25–60 weight %. Also, vinyl chloride type resin is preferably contained in the binder in an amount of 10–80 weight %, or more preferably 20–70 weight %, or most preferably 30–60 weight %.

A hardening agent such as polyisocyanate compound may be used together with the binder of the present invention. As polyisocyanate compound, the following compounds may be used: Reaction product of 3 mols of tolylene diisocyanate with 1 mol of trimethylolpropane (e.g. Desmodule L-75; manufactured by Bayer AG), reaction product of 3 mols of diisocyanate such as xylylene diisocyanate or hexamethylene diisocyanate with 1 mol of trimethylolpropane, burette addition product with 3 mols of hexamethylene diisocyanate, isocyanurate compound of 5 mols of tolylene diisocyanate, isocyanurate addition compound of 3 mols of tolylene diisocyanate with 2 mols of hexamethylene diisocyanate, polymer of isophorone diisocyanate and diphyenylmethane diisocyanate.

The polyisocyanate compound in the magnetic layer is preferably contained in the binder in an amount of 10–50 weight %, or more preferably 20–40 weight %.

When hardening is performed with electron beam irradiation, a compound having reactive double bond such as urethane acrylate may be used.

Total weight of the resin components and hardening agent (i.e. total weight of the binder) is preferably within the range of 15–40 weight parts, or more preferably 20–30 weight parts to 100 weight parts of the ferromagnetic powder.

The ferromagnetic powder to be used in the magnetic recording medium of the present invention is preferably cobalt-containing ferromagnetic iron oxide or ferromagnetic alloy powder with specific surface area of 40–80 $m^2/g$, or more preferably 50–70 $m^2/g$. Crystallite size is preferably 12–25 nm, or more preferably 13–22 nm, or most preferably 14–20 nm. Longer axis length is preferably 0.05–0.25 nm, or more preferably 0.07–0.2 $\mu m$, or most preferably 0.08–0.15 $\mu m$. As the ferromagnetic powder, Fe, Fe—Co, Fe—Ni, or Co—Ni—Fe containing yttrium may be used. In the content of yttrium in the ferromagnetic powder, the ratio of yttrium atoms to iron atoms (Y/Fe) is preferably 0.5–20 atom %, or more preferably 5–10 atom %. If it is lower than 0.5 atom the value of σs of the ferromagnetic powder cannot be increased. This leads to lower magnetic property and, lower electromagnetic transfer characteristics. If it is higher than 20 atom %, the content of iron decreases. This results in poor magnetic property and lower electromagnetic transfer characteristics. Further, the following elements may be contained within the range of less than 20 atom % to 100 atom % of iron: aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, etc. Also, the ferromagnetic metal powder may contain small quantity of water or hydroxide or oxide.

Description will be given now on an example of a method to manufacture ferromagnetic powder with cobalt and yttrium introduced in it according to the present invention.

Acidic gas is blown into an aqueous suspension solution containing ferrous salt and alkali, and iron oxyhydroxide is obtained. This is used as the departing material.

As the type of the iron oxyhydroxide, it is preferable to use α-FeOOH. According to the first of the manufacturing methods, ferrous salt is neutralized with alkali hydroxide, and aqueous suspension solution of Fe(OH)$_2$ is obtained. Acidic gas is blown into this suspension solution, and needle-like product α-FeOOH is prepared. On the other hand, according to the second method, ferrous salt is neutralized with alkali carbonate, and aqueous suspension solution of FeCo$_3$ is prepared. Acidic gas is blown into this suspension solution, and spindle-like product α-FeOOH is obtained. It is preferable that this iron oxyhydroxide is produced by the reaction of aqueous solution of ferrous salt with aqueous solution of alkali to obtain aqueous solution containing ferrous hydroxide, and further by oxidizing this by air oxidation. In this case, Ni salt or salt of alkali earth element such as Ca salt, Ba salt, Sr salt, or Cr salt, Zn salt, etc. may coexist in aqueous solution of ferrous salt. By adequately selecting the salt, it is possible to prepare a product in form of particles (axial ratio).

As the ferrous salt, it is preferable to use ferrous chloride, ferrous sulfate, etc. As alkali, it is preferable to use sodium hydroxide, aqueous ammonia, ammonium carbonate, sodium carbonate, etc. As the salt suitable for such state of coexistence, chlorides such as nickel chloride, calcium chloride, barium chloride, strontium chloride, chromium chloride, zinc chloride, etc. may be preferably used.

Next, when cobalt is introduced to iron, aqueous solution of cobalt compound such as cobalt sulfate, cobalt chloride, etc. is mixed and agitated with slurry of iron oxyhydroxide before introducing yttrium. After a slurry of iron oxyhydroxide containing cobalt has been prepared, aqueous solution containing yttrium is added to this slurry, and by agitating and mixing the solution, cobalt can be introduced into it.

As the ferromagnetic powder of the present invention, neodymium, samarium, praseodymium, lanthanum, etc. may be introduced in addition to yttrium. These can be introduced using chlorides such as yttrium chloride, neodymium chloride, samarium chloride, praseodymium chloride, lanthanum chloride, etc. or nitrate such as neodymium nitrate, gadolinium nitrate, etc. These may be used in combination of two or more different types.

There is no special restriction on the shape of ferromagnetic powder. Normally, the ferromagnetic powder in needle-like, granular, cubic, grain-like or planar shape is used. In particular, it is preferable to use needle-like ferromagnetic powder.

The resin components, the hardening agent and the ferromagnetic powder as described above are kneaded together and dispersed in a solvent such as methyl ethyl ketone, dioxane, cyclohexanone, ethyl acetate etc. normally used in the preparation of magnetic coating material, and a magnetic coating material is prepared. Kneading and dispersion can be performed by a method commonly known.

In addition to the components described above, the magnetic coating material my contain abrasive material such as $\alpha$-Al2O3, $Cr_2O_3$, etc., antistatic agent such as carbon black, fatty acid, fatty acid ester, or additive or filling material normally used, e.g. lubricant such as silicone oil, dispersant, etc.

Next, description will be given on the lower nonmagnetic layer or the lower magnetic layer in case of multi-layer arrangement in the present invention. Inorganic powder used in the lower layer of the present invention may be magnetic powder or nonmagnetic powder. For instance, in case of nonmagnetic powder, it may be selected from inorganic compounds such as metal oxide, metal carbonate, metal sulfate, metal nitride, metal carbide, metal sulfide, etc. As the inorganic compound, the following substance may be used: $\alpha$-alumina with alpha ratio of 90–100%, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. may be used alone or in combination. More preferably, titanium dioxide, zinc oxide, iron oxide, or barium sulfate may be used, or most preferably, titanium dioxide may be used. The nonmagnetic powder has preferably average particle size of 0.005–2 $\mu$m. When necessary, nonmagnetic powder with different average particle sizes may be combined or a single type of nonmagnetic powder may be used alone by widening the particle size distribution to provide the same effect. In particular, it is preferable that the nonmagnetic powder has average particle size of 0.01–0.2 $\mu$m. The pH value of nonmagnetic powder is preferably between 6 and 9. Specific surface area of nonmagnetic powder is preferably 1–100 $m^2/g$, or more preferably 5–50 $m^2/g$, or most preferably 7–40 $m^2/g$. Crystallite size of the nonmagnetic powder is preferably between 0.01–2 $\mu$m. Oil absorption using DBP is preferably 5–100 ml/100 g, or more preferably 10–80 ml/100 g, or most preferably 20–60 ml/100 g. Specific gravity is preferably 1–12, or more preferably 3–6. The shape may be needle-like, spherical, polygonal or planar shape.

On the surface of the nonmagnetic powder, it is preferable that there are provided Al2O3, $SiO_2$, $TiO_2$, $ZrO_2$, $SnO_2$, $Sb_2O_3$, and ZnO by surface treatment. In particular, it is preferable that $Al_{2O3}$, $SiO_2$, $TiO_2$ and $ZrO_2$ are provided to have high dispersion property. Or, more preferably $Al_{2O3}$, $SiO_2$ and $ZrO_2$ are used. These may be used in combination or alone. Further, depending on the purpose, surface treatment layer prepared by coprecipitation may be used, or after treating with alumina, the surface layer may be treated with silica, or this procedure may be reversed. The surface treatment layer may be porous depending on the purpose, while it is preferably homogenous and dense.

Carbon black may be mixed in the lower layer to provide an effect Rs already known, and micro Vickers hardness as desired can be attained. For this purpose, furnace black for rubber, thermal black for rubber, carbon black for color, acetylene black, etc. may be used.

Specific surface area of the carbon black is preferably 100–500 $m^2g$, or more preferably 150–400 $m^2/g$. DBP oil absorption is preferably 20–400 ml/100 g, or more preferably 30–200 ml/100 g. Average particle size of the carbon black is preferably 5–80 m$\mu$, or more preferably 10–50 m$\mu$, or most preferably 10–40 m$\mu$. The pH value of the carbon black is preferably 2–10. Moisture content is preferably 0.1–10%, and tap density is preferably 0.1–1 g/ml. Concrete examples of carbon black used in the present invention are: Blackpearls 2000, 1300, 1000, 900, 800, 880, 700, and Vulcan XC-72 (manufactured by Cabot Inc.), #3050B, #3150B, #3250B, #3750B, #3950B, #950, #650B, #970B, #850B, and MA-600 (manufactured by Mitsubishi Chemical Corporation), Conductex SC, Raven 8800, 8000, 7000, 5750, 5250, 3500, 2100, 2000, 1800, 1500, 1255, and 1250 (manufactured by Columbia Carbon Co.), Ketchenblack EC (manufactured by Akzo), etc. may be used.

For the lower layer in the present invention, magnetic powder may also be used. As the magnetic powder, an alloy having $\gamma$-$Fe_2O_3$, Co-denatured $\gamma$-$Fe_2O_3$, or $\alpha$-Fe as main: component, $CrO_2$, etc. may be used. In particular, it is preferable to use Co-denatured $\gamma$-$Fe_2O_3$. Ferromagnetic powder to be used in the lower layer of the present invention has preferably composition and performance characteristics similar to those of the ferromagnetic powder used in the upper magnetic layer. However, the performance characteristics may be exchanged between the upper and the lower layers depending on the purpose. For instance, in order to improve long wavelength recording property, it is desirable that Hc of the lower magnetic layer is set to a value lower than that of the upper magnetic layer. It is also effective to set Br of the lower magnetic layer to a value higher than that of the upper magnetic layer. In addition, it is possible to provide advantages by adopting multi-layer arrangement.

As binder, lubricant, dispersant, additive, solvent, or dispersion method, etc. for the lower magnetic layer or the lower nonmagnetic layer, those of the magnetic layer can be applied. In particular, for quantity and type of the binder, and adding quantity and type of the additive and the dispersant, the technique already known on the magnetic layer may be applied.

The magnetic coating material prepared by the materials given above is coated on the nonmagnetic support member, and a magnetic layer is formed.

As the nonmagnetic support member to be used in the present invention, polyethylene naphthalate, polyethylene terephthalate, polyamide, polyimide, polyamideimide, aromatic polyamide, polybenzoxydazole, etc. processed by biaxial stretching may be used. More preferably, polyethylene naphthalate and aromatic polyamide are used. The nonmagnetic support member may be processed in advance by corona discharge, plasma treatment, adhesive processing, heat treatment, etc. The nonmagnetic support member to be used in the present invention has preferably a surface with such superb smoothness that it has average surface roughness on central line of 0.1–20 nm with cutoff value of 0.25 mm, or more preferably within the range of 1–10 nm. Also, it is preferable that the nonmagnetic support member not only has lower average surface roughness on the central line but also has no coarse projection of more than <1 $\mu$.

To manufacture the magnetic recording medium of the present invention, a coating solution for the lower layer is coated on the surface of the nonmagnetic support member under running operation or a magnetic coating material is coated at the same time so that the thickness of the magnetic layer after drying will be 0.05–1.00 $\mu$m, or more preferably 0.07–0.5 $\mu$m, and also that the thickness of the lower layer after drying will be 0.5–2.0 $\mu$m, or more preferably 1.0–1.5 $\mu$m.

As the coating device for coating the magnetic coating material as described above, the following may be used: air doctor coat, blade coat, rod coat, extrusion coat, air knife coat, squeeze coat, impregnation coat, reverse coat, transfer roll coat, gravure coat, kiss coat, cast coat, spray coat, spin coat, etc.

For these devices, reference may be made on "The Newest Coating Technique" published by Sogo Gijutsu Center, Co., Ltd. (May 31, 1983).

When the present invention is applied to a magnetic recording medium with two layers or more, the following devices and methods can be proposed:

(1) Using a coating device such as gravure, roll, blade, extrusion, etc. generally applied in the coating of the magnetic coating material, a lower layer is coated at first. While the lower layer is not yet dried, the upper layer is coated using a support pressure type extrusion coating device as disclosed in JP-89046186(B), JP-60238179(A), JP-022065672(A), etc.

(2) Using a coating head having two slits for passing the coating solution as disclosed in JP-63088080(A), JP-02017971(A), or JP-02265672(A), the upper layer and the lower layer are coated almost at the same time.

(3) Using an extrusion coating device with backup roll as disclosed in JP-02174965(A), the upper layer and the lower layer are coated almost at the same time.

A backing layer may be provided on the surface of the nonmagnetic support member where the magnetic coating material is not coated. Normally, the backing layer is a layer prepared as follows: Granular components such as abrasive material, antistatic agent, etc. and the binder are dispersed in an organic solvent, and this coating material for forming the backing layer is coated on the surface of the nonmagnetic support member where the magnetic coating material is not coated.

An adhesive layer may be provided on the surface coated with the magnetic coating material of the nonmagnetic support member and with the coating material for forming the back-coating layer.

The coating layer coated with the magnetic coating layer is dried after magnetic field orientation processing is performed on the ferromagnetic powder contained in the coating layer coated with the magnetic coating material.

After drying as described above, surface smoothening processing is performed on the coating layer. For the surface smoothening processing, super-calender roll or the like is used. By the surface smoothening processing, voids generated by the removal of solvent during drying process are eliminated. Filling ratio of the ferromagnetic powder in the magnetic layer is improved, and a magnetic recording medium with high electromagnetic transfer characteristics can be obtained.

As the roll for calender processing, heat-resistant plastic roll made of material such as epoxy, polyimide, polyamide, polyamideimide, etc. is used. Also, a metal roll may be used.

The magnetic recording medium of the present invention preferably has a surface with such superb smoothness that average surface roughness on the central line is 0.1–4 nm, or more preferably 1–3 nm, with cutoff value of 0.25 mm. As the method for smoothening, calender processing is performed on the magnetic layer, which has been formed by selecting specific type of ferromagnetic powder and binder as described above. The conditions for the calender processing are as follows: The temperature of the calender roll is preferably within the range of 60° C.–100° C., or more preferably 70° C.–100° C., or most preferably 80° C.–100° C. Linear pressure is preferably within the range of 980–4900 N/cm, or more preferably 1960–4412 N/cm, or most preferably 2940–3930 N/cm.

The magnetic recording medium thus prepared can be used by cutting to a size as desired using a cutter.

EMBODIMENT

In the following, detailed description will be given on the present invention referring to Examples and Comparative examples. In the description, the term "part(s)" means "weight part(s)".

Synthesis of Polyurethane Resin

In a container provided with a reflux condenser and an agitator and having inner space substituted with nitrogen in advance, a polyol, a chain extender and a diol containing polar group with composition ratio as shown in Table 1 were dissolved in a 30 weight % solution of cyclohexanone under nitrogen stream at 60° C. Then, 60 ppm of di-n-dibutyl tin dilaurate was added and this was dissolved for 15 minutes. Then, MDI (diphenylmethane diisocyanate) as shown in Table 1 was added. Heating reaction was performed at 90° C. for 6 hours, and polyurethane resin solutions A–G were obtained.

TABLE 1

| Polyurethane | Polyol Type | Polyol Mol ratio | Diol containing polar group Type | Diol containing polar group Mol ratio | Chain extender Type | Chain extender Mol ratio | Diisocyanate Type | Diisocyanate Mol ratio | Mw |
|---|---|---|---|---|---|---|---|---|---|
| A | DD | 15 | Compound A | 3 | HBPA | 85 | MDI | 100 | 42000 |
| B | DD | 15 | Compound B | 3 | ↓ | 85 | ↓ | 100 | 38000 |
| C | DD | 15 | Compound C | 3 | ↓ | 85 | ↓ | 100 | 40000 |
| D | DD | 15 | Compound D | 3 | ↓ | 85 | ↓ | 100 | 37000 |
| E | DD | 15 | Compound E | 3 | ↓ | 85 | ↓ | 100 | 41000 |
| F | Polyester 1 | 5 | Compound A | 3 | ↓ | 95 | ↓ | 100 | 42000 |
| G | Polyether 1 | 8 | Compound A | 3 | ↓ | 98 | ↓ | 100 | 42000 |

Abbreviations used in the table are as follows:
DD: Dimer diol (molecular weight: 537)
Polyester 1: Isophthalic acid/adipic acid/neopentyl glycol = 1/1/1.2 (mol ratio) (Mw: 2000)
Polyether 1: Polypropylene oxide addition product of bisphenol A (Mw: 1000)
Compound A: Polyethlene oxide addition product of sulfoisophthalic acid (Mw: 532)
Compound B: Polypropylene oxide addition product of sulfoisophthalic acid (Mw: 588)
Compound C: Polypropylene polyol containing sulfamic acid group (Mw: 669)
Compound D: Polyethylene polyol containing sulfamic acid group
HBPA: Hydrogenated bisphenol A
MDI: Diphenylmethane diisocyanate Compound A

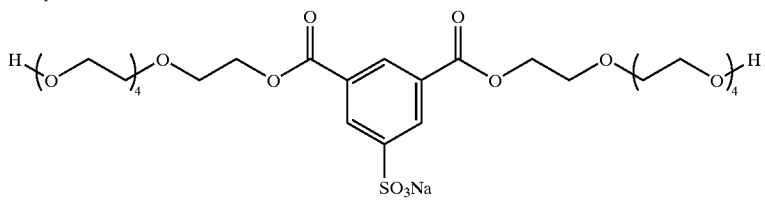

Compound B

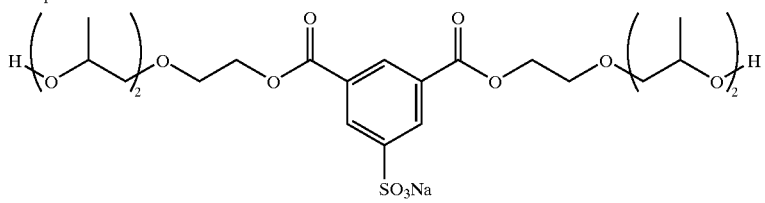

Compound C

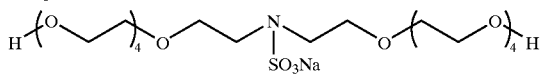

Compound D

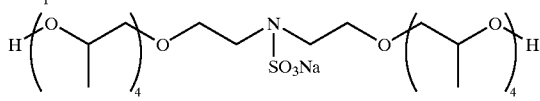

Compound E

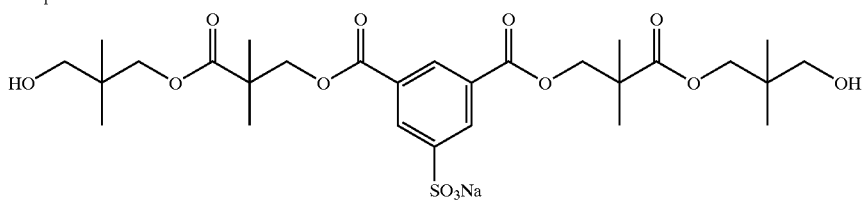

Compound F

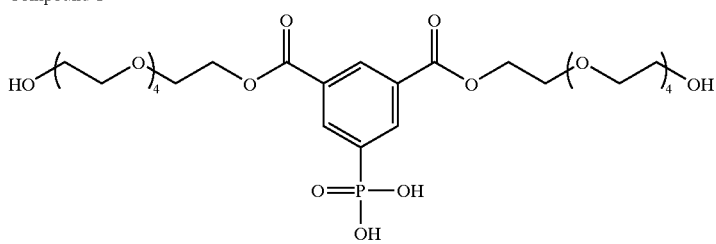

Compound G

TABLE 1-continued

|  | Polyol | | Diol containing polar group | | Chain extender | | Diisocyanate | | |
|---|---|---|---|---|---|---|---|---|---|
| Polyurethane Type | | Mol ratio | Type | Mol ratio | Type | Mol ratio | Type | Mol ratio | Mw |

Compound H

Compound I

EXAMPLE 1

Using an open kneader, 100 parts of ferromagnetic alloy powder (composition: Fe 89 atom %; Co 5 atom %, Y 6 atom %; Hc 159 kA/m; crystallite size 15 nm; BET specific surface area 59 m²/g; longer axis length 0.12 μm; acicular ratio 7; $\sigma_s$, 50 Am²/kg) were pulverized for 10 minutes. Then, this was mixed and kneaded with 10 parts of polyurethane A (solid matter) and 40 parts of cyclohexanone for 60 minutes. Then, the following substances were added:

| | |
|---|---|
| Abrasive material (Al₂O₃ particle size 0.3 μm) | 2 parts |
| Carbon black (particle size 40 nm) | 2 parts |
| Methyl ethyl ketone/toluene (= 1/1) | 200 parts |

The mixure was dispersed for 120 minutes in a sand mill. Then, the following substances were added:

| | |
|---|---|
| Polyisocyanate (solid matter) (Coronate 3041; Nippon Urethane Co.) | 5 parts |
| Butyl stearate | 2 parts |
| Stearic acid | 1 part |
| Methyl ethyl ketone | 50 parts |

The mixture was further agitated for 20 minutes and was then filtered through a filter with average pore size of 1 μm, and a magnetic coating material was prepared.

Next, as the adhesive layer, polyester resin containing sulfonic acid was coated on the surface of a polyethylene naphthalate support member of 10 μm in thickness using a coil bar so that the thickness after drying will be 0.1 μm.

Then, the magnetic coating material for the upper layer was coated at the same time and in multiple layers using a reverse roll so that the thickness after drying will be 1.5 μm. On the nonmagnetic support member with the magnetic coating material coated on it, magnetic field orientation was performed using a magnet of 3000 Gauss while the magnetic coating material was not yet dried. Further, calender processing was performed in combination of metal roll—metal roll—metal roll—metal roll—metal roll—metal roll—metal roll at a rate of 100 m/min, linear pressure of 294.2 kN/m, and at temperature of 90° C., and it was cut to have a width of 3.8 mm.

EXAMPLES 2–4 AND COMPARATIVE EXAMPLES 1–3

The same procedure as above was performed except that the polyurethane A in Example 1 was replaced with each of the polyurethane shown in Table 2.

EXAMPLE 5

The magnetic coating material of Example 1 was used on the upper layer, and the coating solution for the lower layer as given below was prepared and was coated. (Preparation of the coating solution for the lower layer)

Using an open kneader, 85 parts of α-Fe₂O₃ (average particle size 0.15 μm; $S_{BET}$ 52 m²/g, surface treatment layer Al2O₃ and SiO₂; pH 6.5–8.0) were pulverized for 10 minutes. Next, hydroxyethyl sulfonate sodium salt was added to a copolymer of vinyl chloride/vinyl acetate/glycidyl methacrylate (=86/9/5), and 7.5 parts of this compound ($SO_3Na$= $6\times10^{-5}$ eq/g; epoxy=$10^{-3}$ eq/g; Mw 30,000) was kneaded together with 10 parts of polyurethane E (solid matter), and 60 parts of cyclohexanone for 60 minutes. Then, Methyl ethyl ketone/cyclohexanone (=6/4) 200 parts was added, and the mixture was dispersed for 120 minutes in a sand mill.

| | |
|---|---|
| Butyl stearate | 2 parts |
| Stearic acid | 1 part |
| Methyl ethyl ketone | 50 parts |

Further, this was agitated and mixed for 20 minutes and was filtered through a filter with average pore size of 1 μm, and a coating material for the lower layer was prepared.

Next, as the adhesive layer, polyester resin containing sulfonic acid was coated on the surface of a polyethylene naphthalate support member of 10 μm in thickness using a coil bar so that the thickness after drying will be 0.1 μm.

The coating material for the lower layer thus prepared was coated in thickness of 1.5 μm, and immediately thereafter, the magnetic coating material for the upper layer was coated at the same time and in multiple layers using a reverse roll so that the thickness after drying will be 0.1 μm. On the nonmagnetic support member with the magnetic coating material coated on it, magnetic field orientation was performed using a magnet of 0.3 T while the magnetic coating material is not yet dried. Further, calender processing was performed in combination of metal roll—metal roll—metal roll—metal roll—metal roll—metal roll—metal roll at a rate of 100 m/min, linear pressure of 294.2 kN/m, and at temperature of 90° C., and it as cut to have a width of 3.8 mm.

EXAMPLE 6 AND COMPARATIVE EXAMPLE 4

The same procedure as in Example 5 was performed except that the polyurethane for the upper layer and the polyurethane for the lower layer were replaced with the polyurethane shown in Table 3.

EXAMPLE 7

The same procedure as in Example 5 was performed except that α-$Fe_2O_3$ of the lower layer solution (average particle size 0.15 μm; $S_{BET}$ 52 $m^2/g$; surface treatment layer $Al_2O_3$ and $SiO_2$; pH 6.5–8.0) was replaced with titanium oxide (average particle size 0.035 μm; crystal type rutile; $TiO_2$ content 90% or more; surface treatment layer alumina; $S_{BET}$ 35–42 $m^2/g$; true specific gravity 4.1; pH 6.5–8.0).

EXAMPLE 8 AND COMPARATIVE EXAMPLE 5

The same procedure as in Example 5 was performed except that the polyurethane for the upper layer and the polyurethane for the lower layer were replaced with the polyurethane shown in Table 3.

Measuring Methods
(1) Surface Smoothness

Using a scanning probe microscope (Nanoscope II; Digital Instrument Inc.), scanning was performed for an area of 30 μm×30 μm with tunnel current of 10 nA and bias current of 400 mV, and number of projections of 10 nm or more was determined. The result was expressed in relative value, regarding the result in Comparative example 1 as 10.

(2) Electromagnetic Transfer Characteristics (Reproduction Output)

Using DDS3 drive, a single frequency signal of 4.7 MHz was recorded with optimal recording current, and the reproduction output was measured. The result was expressed in relative value, regarding reproduction output of Comparative example 1 as 0 dB.

(3) Repeated Running Durability

A tape was stored for a week under the condition of 60° C. and 90% relative humidity, and its magnetic layer surface was brought into contact with a guide pole used in DDS3 drive under the conditions of 40° C. and 80% relative humidity. A load of $9.81\times10^{-2}$ N (T1) was applied. Then, a tensile force (T2) was applied at a rate of 8 mm/s. From the tension T2/T1, friction coefficient on the magnetic surface to the guide pole was obtained.

The measurement was performed up to 500 passes of repeated operations. Friction coefficient was obtained at 1st pass and 500th pass. The friction coefficient at 500th pass was expressed in relative value, regarding the friction coefficient at 1st pass as 1.

Stain or contamination of the guide pole after the measurement was examined under differential interference light microscope, and the result was evaluated under the following criteria:

Very good: No stain was observed.

Good: Stains were observed, but most portions were without stain.

No good: There were more portions with stains than the portions without stain.

(4) SQ Property

Using a vibration specimen type flux meter (manufactured by Toei Industry Co., Ltd.), measurement was made under external magnetic field intensity of $3.98\times10^5$ A/m.

TABLE 2

| | Polyurethane | Coating film smoothness | SQ | Reproduction output (dB) | Storage property under high temperature and high humidity | |
|---|---|---|---|---|---|---|
| | | | | | Changes in friction coefficient | Stains on guide pole |
| Example 1 | A | 90 | 0.9 0.9 | 0.7 | 1.2 | Very good |
| Example 2 | B | 87 | 0.9 2 | 1 | 1.5 | Very good |
| Example 3 | C | 93 | 0.9 | 0.8 | 1.3 | Very good |
| Example 4 | D | 92 | 0.9 | 0.8 | 1.2 | Very good |
| Comparative Example 1 | E | 100 | 0.8 7 | 0 | 2.5 | Good |
| Comparative Example 2 | F | 115 | 0.8 5 | −0.2 | 2.7 | Good |
| Comparative Example 3 | G | 112 | 0.8 7 | 0.1 | 4.3 | No good |

TABLE 3

| | Polyurethane | | Coating film smoothness | SQ | Reproduction output (dB) | Storage property under high temperature and high humidity | |
|---|---|---|---|---|---|---|---|
| | | | | | | Changes in | |
| | Upper layer | Lower layer | | | | friction coefficient | Stains on guide pole |
| Example 5 | A | E | 89 | 0.90 | 0.8 | 1.1 | Very good |
| Example 6 | E | A | 92 | 0.87 | 0.8 | 1.2 | Very good |
| Example 7 | A | E | 89 | 0.90 | 0.7 | 1.2 | Very good |
| Example 8 | E | A | 94 | 0.87 | 0.8 | 1.2 | Very good |
| Comparative Example 4 | E | E | 104 | 0.87 | 0.2 | 3.2 | Good |
| Comparative Example 5 | E | E | 102 | 0.87 | 0.2 | 2.8 | Good |

As described above, in the magnetic recording medium of the present invention, it is possible to have smooth surface on the coating film, and to obtain high SQ property and better electromagnetic transfer characteristics. The durability under high temperature condition is improved.

What we claim is:

1. A magnetic recording medium, comprising at least one magnetic layer, said magnetic layer containing ferromagnetic powder and a binder and placed on a nonmagnetic support member, whereby said binder contains a polyurethane resin, using a diol compound having a cyclic structure and a long-chain alkyl chain, and a polyol with weight average molecular weight (Mw) of 400–5000 and having at least one of polar group selected from the following groups:

—$SO_3M$, —$SO_4M$, —$PO_3M_2$, —$PO_4M_2$, —$NHSO_3M$, >$NSO_3M$, and —$COOM$ where M represents hydrogen, at least one type of alkali metal of potassium, sodium or lithium, and an organic amine containing at least one type of alkylamine or alkanol.

2. A magnetic recording medium according to claim 1, wherein said diol compound is at least one selected from Formula 1 or Formula 2:

Formula 1

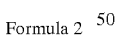

Formula 2 where Z is selected from benzene ring, naphthalene ring and cyclohexane ring;

$R^3$ and $R^4$ each represents an alkylene group containing 1–18 carbon atoms; and $R^5$ and $R^6$ each represents an alkyl group containing 2–18 carbon atoms.

3. A magnetic recording medium according to claim 1, wherein said diol compound is at least one selected from Formula 3–Formula 6:

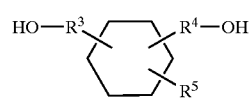

Formula 3

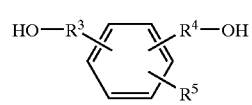

Formula 4

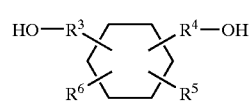

Formula 5

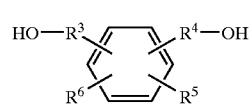

Formula 6 wherein $R^3$ and $R^4$ each represents an alkylene group containing 1–18 carbon atoms; and $R^5$ and $R^6$ each represents an alkyl group containing 2–18 carbon atoms.

4. A magnetic recording medium according to claim 1, wherein said diol compound is a dimer diol expressed by Formula 7:

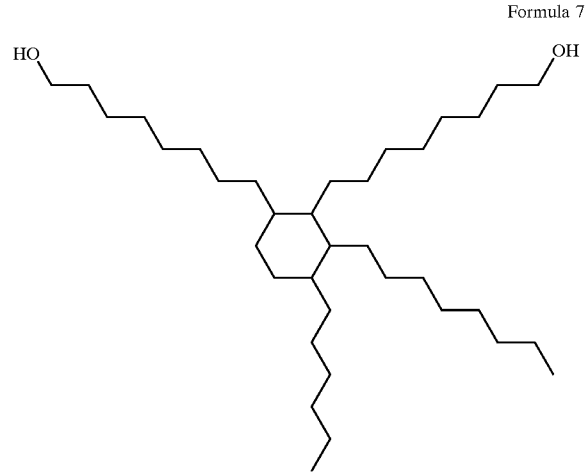

Formula 7

* * * * *